United States Patent Office 2,985,024
Patented May 23, 1961

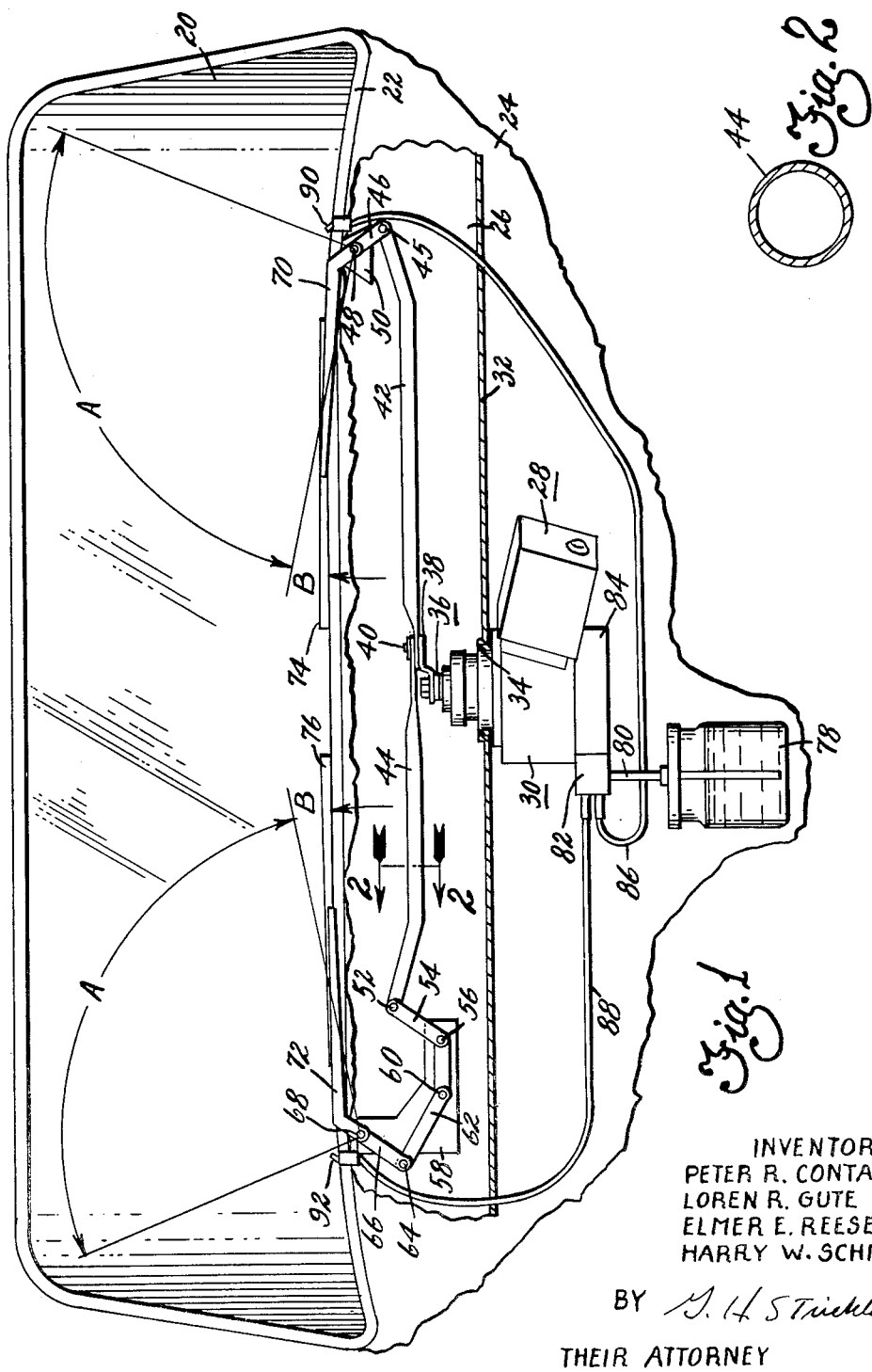

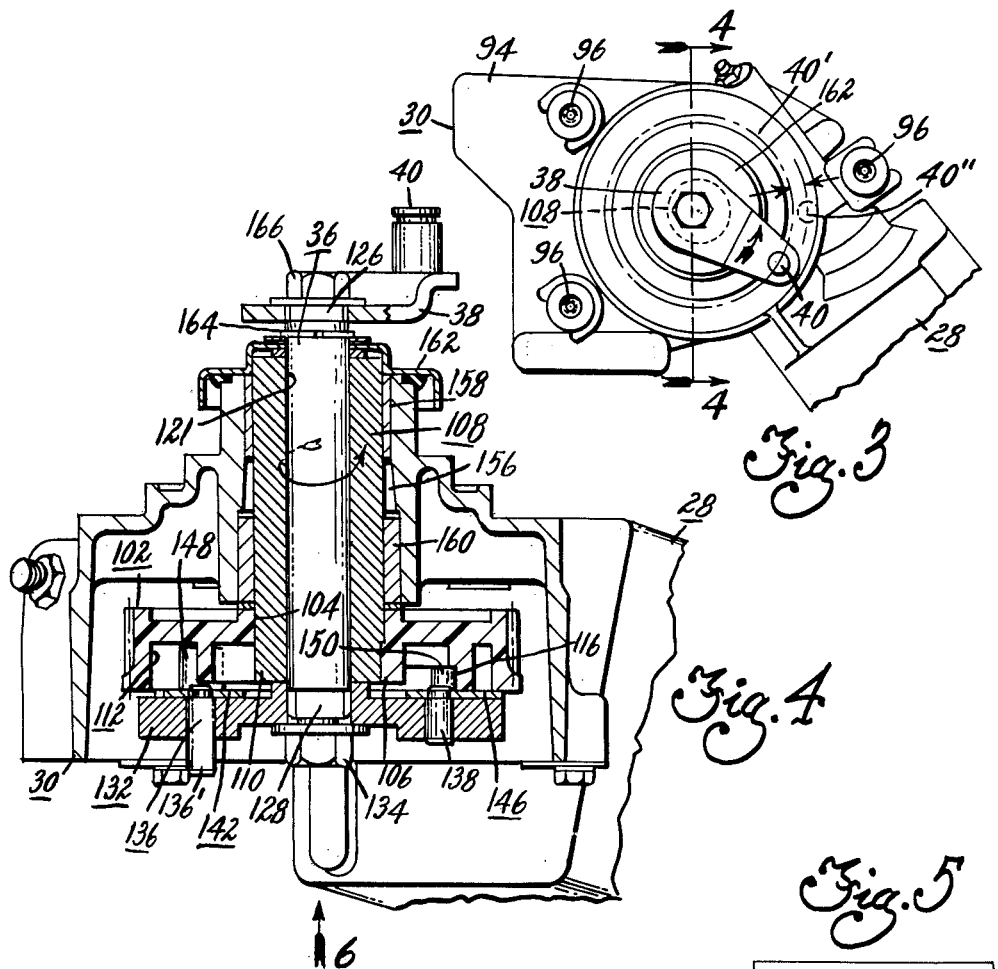
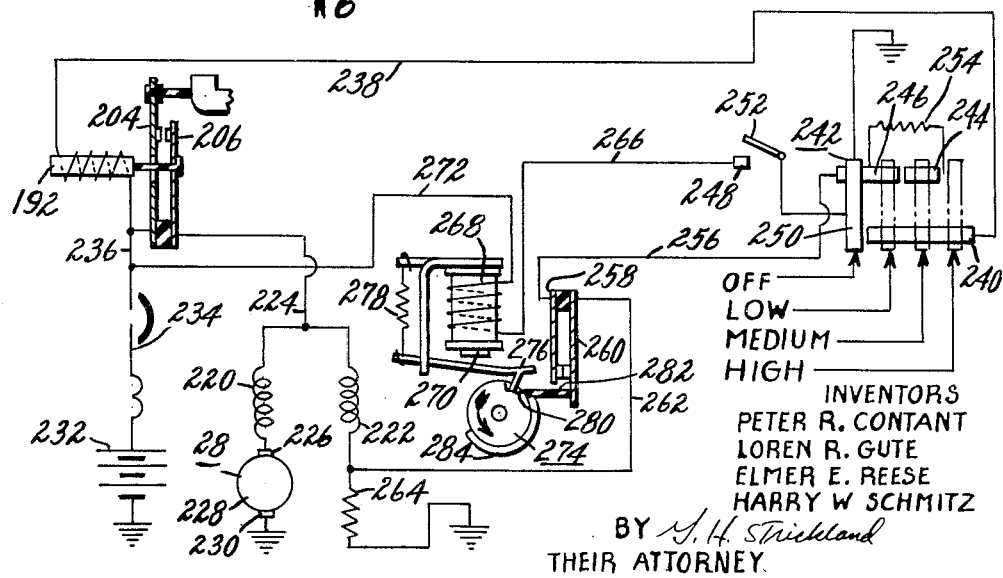

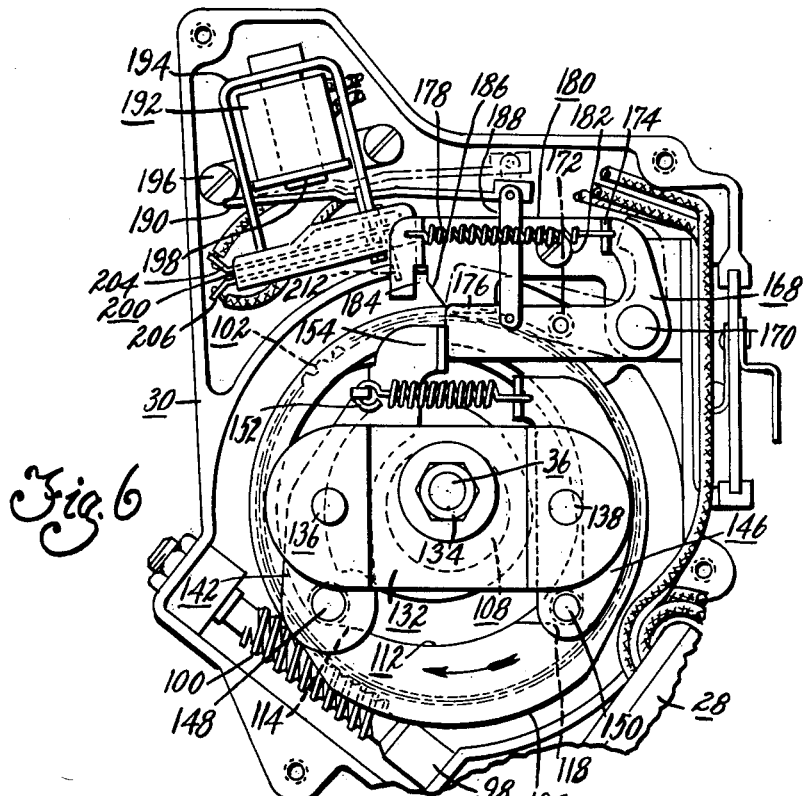
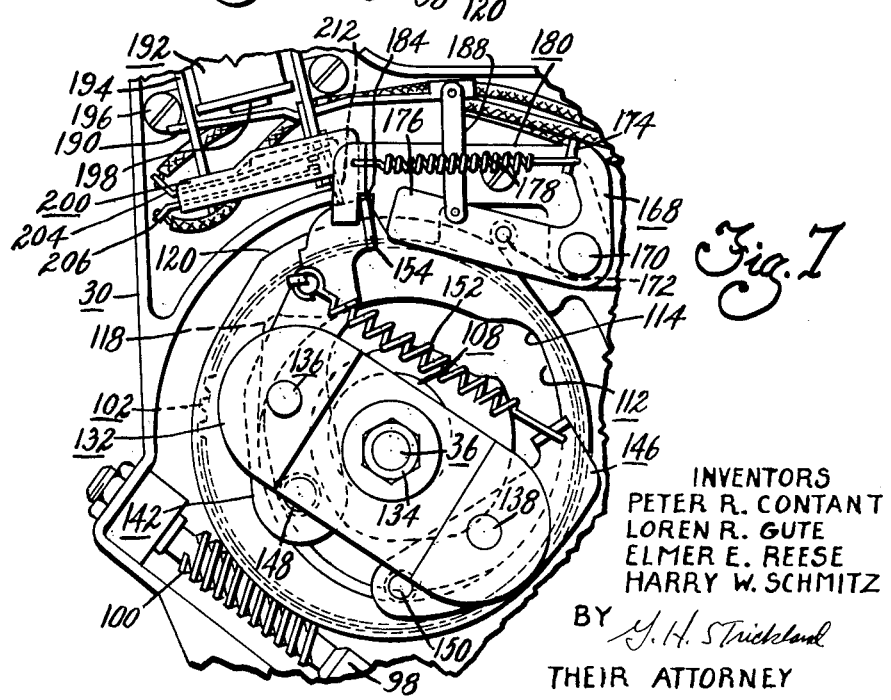
INVENTORS
PETER R. CONTANT
LOREN R. GUTE
ELMER E. REESE
HARRY W. SCHMITZ
BY Y. H. Strickland
THEIR ATTORNEY

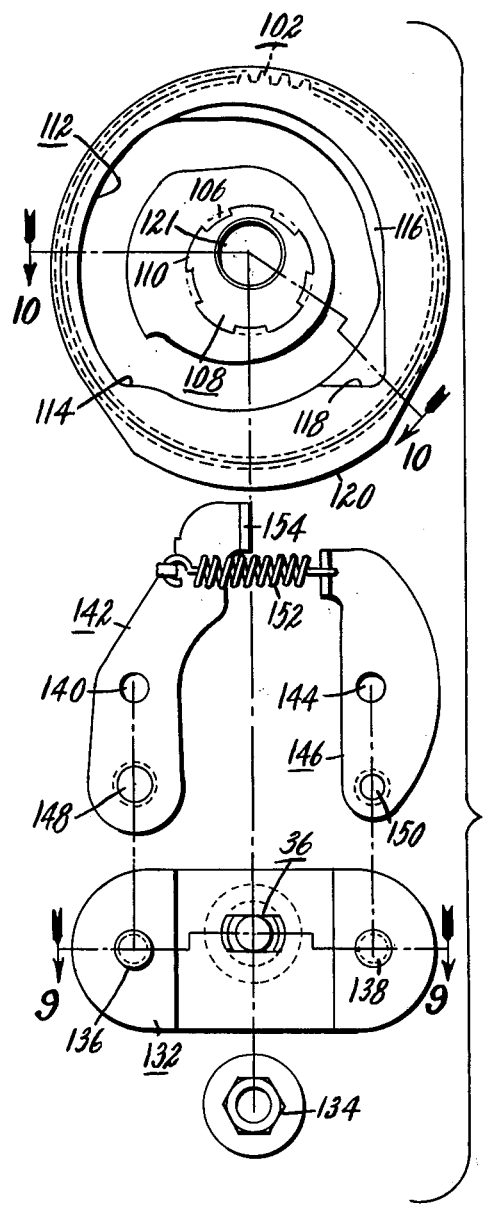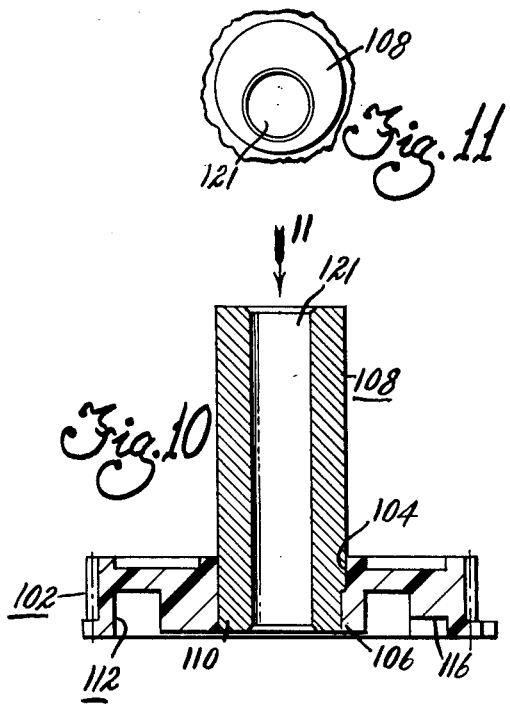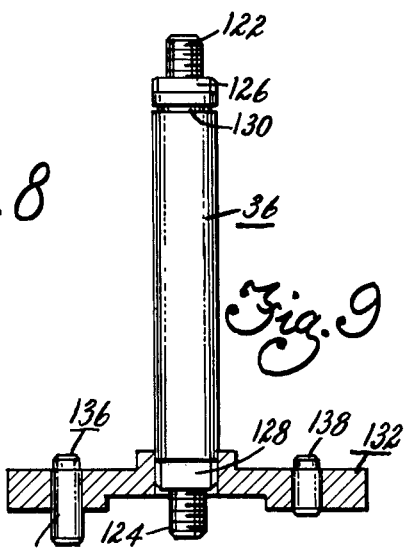

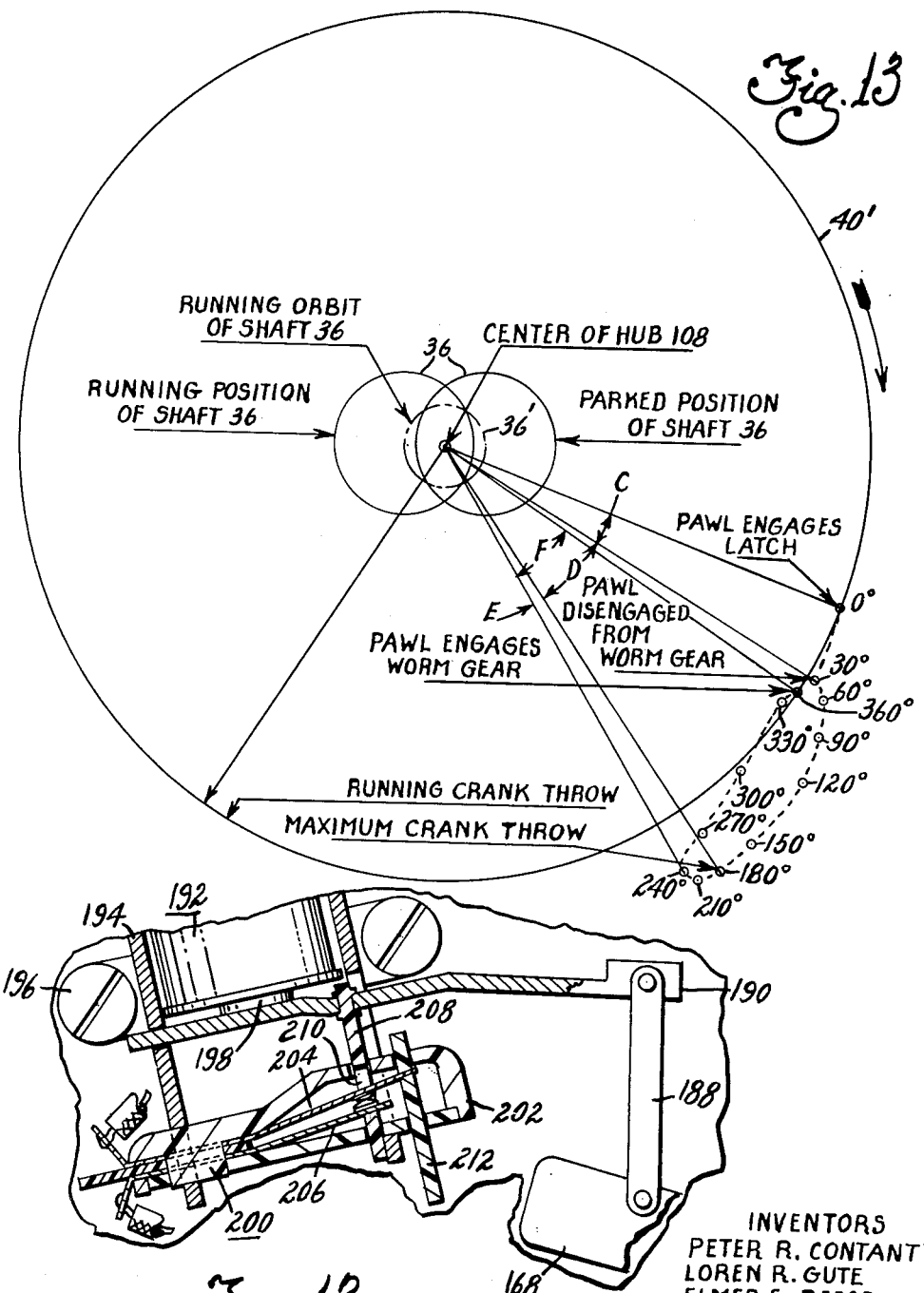

2,985,024

WINDSHIELD CLEANING MECHANISM

Peter R. Contant, Rochester, Loren R. Gute, Fairport, and Elmer E. Reese and Harry W. Schmitz, Rochester, N.Y., and Robert M. Fox, Detroit, and Delbert D. De Rees, Lake Orion, Mich., assignors to General Motors Corporation, Detroit, Mich., a corporation of Delaware Filed Mar. 3, 1958, Ser. No. 718,789

23 Claims. (Cl. 74—70)

This invention pertains to the art of windshield cleaning, and particularly to mechanism for actuating windshield wipers from a rotary power source either alone, or conjointly with means for spraying liquid solvent onto the windshield.

Heretofore, a crank assembly for actuating windshield wipers has been devised wherein rotation of a crank is utilized to oscillate wiper blades throughout a running stroke, and wherein the rotation of the crank can be substantially arrested and the throw of the crank increased so as to move the wiper blades from their normal inboard stroke end positions to a depressed parked position against the cowl of a motor vehicle. A crank assembly of this type is disclosed in copending application Serial No. 551,800 filed December 8, 1955, in the name of Elmer E. Reese and assigned to the assignee of this invention, now Patent No. 2,866,344. The present invention relates to windshield wiper actuating mechanism driven from a rotary power source including a crank assembly having a shaft, the axis of the shaft being shifted after rotation thereof has been substantially arrested so as to achieve depressed parking. In addition, the rotary power source, which may take the form of an electric motor, can also be used to drive a washer pump so as to effect conjoint operation of the wiper unit and a washer unit to clean the vehicle windshield.

Accordingly, among our objects are the provision of windshield wiper actuating mechanism driven by a rotary power source and including a variable throw crank assembly; the further provision of wiper actuating mechanism including a variable throw crank assembly wherein rotary movement of the crank assembly is substantially arrested prior to varying the throw thereof; the further provision of wiper unit mechanism including a crank assembly having an interruptible driving connection with a rotatable driving member and including eccentric means for varying the throw of the crank assembly during relative rotation between the crank assembly and the driving member; and the still further provision of an electric motor driven windshield wiper actuating mechanism including a variable throw crank assembly, electromagnetic means for controlling the throw of the crank assembly, and means for actuating a washer pump in timed relation with the stroking movement of the wiper blades.

The aforementioned and other objects are accomplished in the present invention embodying eccentric means for shifting the axis of a shaft which carries a crank arm together with means for substantially arresting the rotation of the shaft prior to shifting the axis thereof. Specifically, the mechanism includes a unidirectional electric motor having a worm which meshes with a worm gear. The worm gear includes a hub which is rotatably journalled in a housing such that the worm gear and the hub rotate about the center, or axis, of the hub. The hub has an eccentric, or off-center, bore therethrough within which a shaft is rotatably journalled. A driven element, or plate, is rigidly attached to one end of the shaft, and a crank arm is rigidly attached to the other end of the shaft. The crank arm carries a single crank pin to which the flattened inner ends of tubular connecting rods are pivotally connected. The outer end of one of the tubular connecting rods is pivotally connected to a crank arm attached to the pivot shaft of one of the wiper arm and blade assemblies. The outer end of the other connecting rod is pivotally connected to the end of a bellcrank having an intermediate fixed pivot. The other end of the bellcrank is pivotally connected to an idler link which is connected to the crank arm attached to the pivot shaft of the other wiper blade and arm assembly.

Upon rotation of the crank, the wiper blade and arm assemblies will be oscillated over asymmetrical paths throughout a running stroke, and to obtain depressed parking of the wiper blades, the axis of the crank shaft is shifted to increase the throw of the crank. The worm gear is formed with a cam track having a pair of notches. A drive pawl and a lock pawl are pivotally mounted on the driven plate, each of the pawls having in pin adapted to be received in a notch in the worm gear so as to drivingly interconnect the driven plate with the worm gear. When the driven plate is connected to rotate with the worm gear, the shaft and crank arm rotate with the worm gear about the axis of the hub, in which instance the axis of the shaft orbits around the axis of the hub.

The mechanism also includes a latch arm which is movable into the path of movement of one end of the drive pawl so as to engage the drive pawl, so that during continued rotation of the worm gear, the driving connection between the driven plate and the worm gear will be interrupted. When the latch engages the drive pawl, rotation of the driven plate, the shaft and the crank arm is substantially arrested. However, the driven plate, shaft and crank arm move angularly throughout a small angle during rotation of the worm gear and hub relative to the driven plate due to the configuration of the cam track in the worm gear. When the worm gear has rotated 180° after initial engagement of the latch and the drive pawl, the shaft will shift to the other side of the axis of the hub whereupon the throw of the crank is a maximum. Slightly before the throw of the crank is a maximum, a parking switch is actuated by the drive pawl to deenergize the electric motor with the wiper blades in the depressed parked position.

The latch is controlled by an electromagnet which, when energized, retains the latch in a position where it cannot engage the drive pawl during rotation of the worm gear and the driven plate. In addition, in order to reduce the size of the electromagnet required to effect movement of the latch, the latch is cammed by the worm gear so as to reduce the air gap between the armature and the core of the electromagnet, when the wiper blades are driven to the parked position.

One of the pins on the driven plate to which the drive pawl is pivotally attached extends outwardly from the drive plate and can be utilized to drive a cam for actuating a washer pump in timed relation with the stroking movement of the wiper blades. The washer pump may be of the type disclosed in copending application, Serial No. 709,056, filed January 15, 1958 now Patent No. 2,905,962, in the name of Eugene R. Ziegler, and assigned to the assignee of this invention.

Further objects and advantages of the present invention will be apparent from the following description, reference being had to the accompanying drawings, wherein a preferred embodiment of the present invention is clearly shown.

In the drawings:

Figure 1 is a fragmentary view, partly in section and partly in elevation, of a vehicle equipped with the windshield cleaning mechanism of this invention.

Figure 2 is a sectional view taken along line 2—2 of Figure 1.

Figure 3 is a fragmentary top view of the wiper motor and crank assembly.

Figure 4 is an enlarged sectional view taken along line 4—4 of Figure 3.

Figure 5 is an electric schematic depicting the circuits for controlling the wiper unit and the washer unit.

Figure 6 is a horizontal view in elevation taken in the direction of arrow 6 of Figure 4 showing in full lines the relative location of the several parts at the start of the parking cycle, and in phantom lines the location of the parts in their normal running position.

Figure 7 is a fragmentary view similar to Figure 6 showing the relative locations of the parts with the wiper blades in the depressed parked position and the wiper motor deenergized.

Figure 8 is an exploded view of certain parts of the crank assembly, illustrating the relative positions at the start of the parking cycle as depicted in Figure 6.

Figure 9 is a sectional view taken along line 9—9 of Figure 8.

Figure 10 is a sectional view taken along line 10—10 of Figure 8.

Figure 11 is a fragmentary view taken in the direction of arrow 11 of Figure 10.

Figure 12 is an enlarged fragmentary sectional view of the parking switch.

Figure 13 is a diagrammatic view illustrating the motion of the crank pin during parking and running cycles.

With particular reference to Figure 1, a portion of a vehicle is shown including a windshield 20, a lower rail 22, a firewall 24 and a plenum chamber 26. The windshield cleaning mechanism may comprise a rectangular frame unidirectional electric motor 28 attached to a crank assembly housing 30, the major portion of which is disposed within the engine compartment of the vehicle. A portion of the housing 30 extends through an opening in the bottom wall 32 of the plenum chamber, a grommet 34 being used to seal off the plenum chamber 26 from the engine compartment. The crank assembly housing 30 is attached to the bottom wall 32 of the plenum chamber by a plurality of bolts, to be described.

The crank assembly 30 includes a rotary shaft 36 having a single crank arm 38 drivingly connected thereto. The shaft 36 is substantially vertically arranged and the crank arm 38 carries the crank pin 40 to which the flattened inner ends of tubular connecting rods 42 and 44 are rotatably connected. The flattened outer end of connecting rod 42 is pivotally connected at 45 to a crank arm 46 attached to a substantially horizontally arranged pivot shaft 48. The pivot shaft 48 is rotatably journalled in a housing 50 suitably attached to the vehicle. The flattened outer end of tubular link 44 is pivotally connected at 52 to one end of a bellcrank 54 having an intermediate fixed pivot 56 carried by a housing 58. The other end of the bellcrank 54 is pivotally connected at 60 to an idle arm 62 which has its other end pivotally connected at 64 to a crank arm 66. The crank arm 66 is rigidly attached to a substantially horizontally arranged pivot shaft 68 which is rotatably journalled on the housing 58. The housing 58 is suitably attached to the vehicle. The spaced pivot shafts 48 and 68 have attached thereto wiper arms 70 and 72 which carry wiper blades 74 and 76, respectively. The drive arrangement includes a single rotary crank for imparting asymmetrical oscillation to the pair of spaced wiper blades and is similar to that disclosed in copending application Serial No. 686,432 filed September 26, 1954, in the name of Harry W. Schmitz et al. and assigned to the assignee of this invention. During normal running operation of the crank 38, the wiper blades 74 and 76 are oscillated throughout a running stroke indicated by angle A in Figure 1. When the control electromagnet is deenergized, the wiper blades 74 and 76 are automatically moved to a depressed parked position against the lower rail 22, the depressed parked position being displaced throughout an angle B from the inboard stroke end of the normal running stroke. The depressed parking of the wiper blades is accomplished by varying the throw of the crank 38 as will be described more particularly hereinafter.

The windshield cleaning mechanism also includes a washer unit which is operable conjointly with the wiper unit. The washer unit comprises a solvent reservoir 78 disposed within the engine compartment of the vehicle, which is connected by a conduit 80 to a check valve assembly 82 associated with a washer pump 84 that is attached to the crank assembly housing 30. The washer pump may be of the type disclosed in the aforementioned copending application Serial No. 709,056, now Patent No. 2,905,962, and accordingly, has an interruptible driving connection with the crank assembly of the wiper motor 28 so that when the drive connection is established the pump 84 will intermittently discharge liquid solvent through conduits 86 and 88 and spaced washer nozzles 90 and 92 onto the windshield 20 in timed relation with the stroking movement of the wiper blades 74 and 76.

With particular reference to Figures 3, 4 and 6, the crank assembly housing 30 is formed with an integral bracket 94 having three grommet surrounded mounting holes 96. The mounting holes 96 receive bolts, not shown, for attaching the crank assembly housing 30 to the lower wall 32 of the plenum chamber. The unidirectional motor 28 includes an armature shaft 98, as shown in Figure 6, which extends into the crank housing 30 and has an integral worm 100. The worm 100 meshes with a worm gear 102 at all times, so that whenever the motor 28 is energized and the armature shaft 98 is rotating the worm gear 102 will be driven in the clockwise direction as viewed in Figure 6.

With particular reference to Figures 8 through 11, the worm gear 102, which may be formed of any suitable plastic, is formed with a central opening 104 having a plurality of circumferentially spaced straight splines 106. The straight splines 106 mate with a complementary set of straight splines 110 formed on a hub 108, the end portion of which extends through the aperture 104. Accordingly, the worm gear 102 is drivingly connected to the hub 108 at all times. In addition, one side of the worm gear 102 is formed with a cam track 112 having a notch 114 and a ledge portion 116 located in a plane spaced from but parallel to the bottom of the track 112 and having a second notch 118. The ledge portion 116 subtends an angle of substantially 180° whereas the cam track 112 extends throughout 360°. In addition, the worm gear 102 is formed with a cam flange 120.

The eccentric hub 108 has an eccentric through bore 121 within which the shaft 36 is rotatably journalled. The axis of the through bore 121 is parallel to but spaced from the axis of the hub 108. The shaft 36 has integral stud portions 122 and 124 at opposite ends as well as flats 126 and 128. In addition, the shaft 36 is formed with an annular groove 130 adjacent its upper end as clearly shown in Figure 9. The inner end of the shaft 36 receives a plate 132 having a central aperture formed with flat sides so that the plate 132 is connected at all times to rotate with the shaft 36. The plate 132 is held in assembled relation with the shaft 36 by a nut 134 which engages the stud 124. The plate 132 has a pair of diametrically opposed pivot pins 136 and 138. The pivot pin 136 protrudes from both sides of the drive plate 132, whereas the pivot pin 138 projects from only the upper surface of the drive plate 132 as seen in Figure 9. The projecting end of the pivot pin 136 disposed on the upper side of the drive plate 132, as viewed in Figure 9, extends through an aperture 140 of a drive pawl 142 so as to pivotally support the drive pawl. The pivot pin 138 projects through an intermediate aperture 144 of a lock pawl 146. The drive pawl 142 has a cam follower pin 148 attached to one end thereof which is received within the cam track 112 of the worm gear 102. The lock pawl 146 has a pin 150 attached to one end thereof which is adapted to ride on the ledge 116 of the cam track 112. The opposite ends of the lock pawl and the drive pawl are interconnected by a coil-type compression spring 152. In addition, one end of the drive pawl 142 is formed with an upstruck flange 154.

Referring to Figure 4, the manner in which the crank mechanism is assembled will be described. The worm gear 102 is molded on the hub 108 to form an integral subassembly which is inserted through a bore 156 of the housing 30. The hub 108 is rotatably journalled in the bore 156 of the housing 30 by a pair of spaced bearings 158 and 160. A shield 162 is placed over the end of the hub 108 and retained in position by snap ring 164 which is received in the annular groove 130 of the shaft 36 which is inserted through the eccentric bore 121 of the hub 108. The crank arm 38 which has an aperture with flat sides, is assembled with the shaft 36 by a nut 166. The driven plate and pawl assembly is preassembled with the inner end of the shaft 36 by the nut 134 so that the follower pin 148 of the drive pawl 142 rides the cam track 112 and the follower pin 150 of the lock pawl 146 rides on the ledge 116. The tension spring 152 continuously biases the drive pawl 142 and the lock pawl 146 about their pivotal connections with the plate 132 so that the follower pins 148 and 150 are urged radially outward whereby the pins 148 and 150 will engage their respective notches 114 and 118 in one angular position of the worm gear 102 relative to the plate 132.

As seen in Figure 6, when the follower pins 148 and 150 of the drive pawl 142 and the lock pawl 146 engage their respective notches 114 and 118, the drive plate 132 and hence the shaft 36 will be connected for rotation with the worm gear 102. As the worm gear 102 rotates about the axis of the hub 108, the axis of the shaft 36 will move in an orbit around the axis of the hub 108, as indicated by broken lines 36' in Figure 13, due to the eccentric location of the bore 121 in the hub 108. When the respective pins of the drive and lock pawls engage their respective notches in the worm gear, the crank arm 38 is rotated in its running orbit wherein the crank pin 40 rotates in an orbit indicated by broken lines 40' in Figure 3. During rotation of the crank pin 40 in the running orbit 40', the radial distance between the center of the crank pin 40 and the axis of the hub 108 remains fixed so that the throw of the crank is fixed. At this time, the wiper blades 74 and 76 will be moved throughout their running strokes as indicated by the angle A in Figure 1.

Referring to Figures 6 and 7, a latch arm 168 is pivotally mounted on a fixed pivot pin 170 in the housing 30. The latch arm 168 has a follower pin 172 attached thereto and a flanged end 174. The other end 176 of the latch arm is movable into and out of the path of the flange 154 on the drive pawl 142. The flanged end 174 of the latch arm 168 is connected by a tension spring 178 to a stop member 180 which is rigidly attached to the housing 30 by a screw 182. The stop 180 is formed with a notch 184 having a chamfered entrance wall 186. The spring 178 normally urges the latch arm 168 in the counterclockwise direction about pivot pin 170 to the full line position shown in Figure 6. In addition, the latch arm 168 is connected by a link actuator 188 to an armature 190 of an electromagnet 192. The electromagnet 192 includes a U-shaped frame 194 attached by screws 196 to the housing 30. The armature 190 is pivotally mounted in the U-shaped frame 194, and upon energization of the electromagnet, the armature 190 is moved into engagement with the core 198 thereof as shown by broken lines in Figure 6. When the armature 190 is in the broken line position of Figure 6, the latch arm 168 is moved by the actuator link 188 to the broken line position wherein the end 176 is out of the path of movement of the flange 154 on the drive pawl during rotation thereof.

With particular reference to Figures 6 and 12, a parking switch assembly 200 is also attached to the frame 194 of the electromagnet. The parking switch assembly 200 includes an insulated housing 202 having a pair of leaf spring contacts 204 and 206 therein. The leaf spring contact 206 is engageable with an insulated bar 208 having an intermediate slot 210, the other end of the bar 208 being attached to the armature 190. The leaf spring contact 204 is connected to an insulated bar 212 which extends in an opposite direction from the housing 202. When the electromagnet 192 is energized and the armature 190 is moved into engagement with the core 198, the contact 206 is moved into engagement with the contact 204 by the bar 208. When the electromagnet 192 is deenergized contacts 204 and 206 remain in engagement since they are normally biased towards each other by their inherent resiliency. Contacts 204 and 206 can be separated by upward movement of the actuator bar 212 as shown in Figure 7.

As aforementioned, during normal running operation of the wiper motor, the electromagnet 192 is energized thereby moving contacts 206 and 204 into the position of Figure 12. Since contacts 204 and 206 control energization of the electric motor 28, as will be described more particularly hereinafter, the motor will drive the worm gear 102 in the clockwise direction as viewed in Figure 6. Moreover, since the latch arm 168 is moved to the broken line position of Figure 6 when the electromagnet 192 is energized, and since the drive pins 148 and 150 of the drive and lock pawls, respectively, engage their notches 114 and 118, the plate 132 and the shaft 36 will be rotated in the clockwise direction with the worm gear and the hub 108. Accordingly, the crank arm 38 will be rotated in the counterclockwise direction as viewed in Figure 3 with the crank pin 40 describing an orbit 40' as seen in Figures 3 and 13.

In order to move the wiper blades 74 and 76 to the depressed parked position, as seen in Figure 1, the electromagnet 192 is deenergized. Upon deenergization of the electromagnet 192, the spring 178 moves the latch arm 168 from the broken line position of Figure 6 to the full line position. The latch arm 168 moves the armature 190 through the link 188 from the broken line position to the full line position of Figure 6. The switch contacts 204 and 206 remain in engagement, and hence, the motor 28 continues to rotate. When the drive pawl 142 arrives at the angular position in which it is shown in Figure 6, the flange portion 154 engages the end 176 of the latch arm. During continued rotation of the worm gear 102 and the hub 108 from the position of Figure 6 to the position of Figure 7, namely 180°, the drive pins 148 and 150 are cammed out of their respective notches 114 and 118. This interrupts the driving connection between the plate 132 and the worm gear. However, due to the configuration of the cam track 112, the plate 132 and the shaft 36 move angularly about 32° in the clockwise direction during rotation of the worm gear 102 from the position of Figure 6 to the position of Figure 7. Accordingly, while rotation of the plate 132, the shaft 36 and the crank 38 is substantially arrested by engagement of the drive pawl 142 and the latch arm 168, due to interruption of the driving connection between the worm gear and the drive pawl, the plate 132 will be moved angularly in a clockwise direction as viewed in Figure 6 throughout an angle of substantially 32°.

As seen in Figure 13, the drive pawl 142 will be completely disengaged from the notch in the worm gear after rotation of the worm gear 102 throughout an angle of 30° after engagement between the drive pawl and the latch arm 168. During this 30° rotation of the worm gear 102, the plate 132 will move throughout an angle C. During continued relative rotation between the worm gear and the plate 132, the hub 108 will move the shaft 36 downwardly from the position of Figure 6 to the position of Figure 7 so as to increase the throw of the crank to a maximum as indicated by 40'' in Figure 3. During this movement, the plate 132 is moved throughout an angle D. Moreover, as the plate 132 moves angularly, the flange 154 of the drive pawl 142 moves into the notch 184 of the stop plate 180. When the drive pawl 142 moves into the notch 184 it engages the actuator bar 212 thereby moving contact 204 out of engagement with contact 206 so as to deenergize the motor 28. In addition, the follower 172 on the latch arm 168 is engaged by the cam flange 120 on the worm gear, and thus is moved towards its running position. This movement of the latch arm 168 likewise moves the armature 190 towards the core 198 of the electromagnet through the link actuator 188 so as to reduce the air gap between the core and the armature thereby reducing the size of electromagnet required to control the latch arm 168.

Since the motor is deenergized when the crank throw is substantially maximum, and since the driving connection between the shaft 36 and the worm gear 102 is interrupted, the motor can coast to a standstill without appreciably altering the position of the wiper blades.

For example, in a typical motor vehicle installation, the radial distance between the axis of the hub 108 and the crank pin 40 during operation of the running orbit 40' may be 1.45 inches and the distance between the axis of the hub 108 and the axis of the through bore 121' may be .13 inch. Therefore, the maximum crank throw with the shaft 36 in the parking position will be 1.71 inches so that the variation in crank throw is .26 inch. The parts may be arranged so that the parking switch will be opened by the drive pawl when the crank throw is 1.69 inches after which the motor coasts to a standstill. In normal operation it has been found that the worm gear will come to rest within 40° rotation after motor deenergization. However, under no condition will the worm gear rotate more than 80° after motor deenergization. The crank throw is 1.69 inches at the 130° worm gear position of Figure 13, and 80° additional rotation of the worm gear will not alter the crank throw more than .02 inch.

Upon reenergization of the electromagnet 192, the switch contacts 204 and 206 are moved into engagement by the actuator bar 208 and the latch arm 168 is moved to the running position as indicated by dotted lines in Figure 6. Upon energization of the motor 28 due to engagement of switch contacts 204 and 206, the worm gear 102 will be driven in the clockwise direction as viewed in Figure 7, and due to the configuration of the cam track 112, the drive plate 132 and the shaft 36 will be moved angularly in the clockwise direction throughout an angle E during rotation of the worm gear 102 to an angular position 240° clockwise from initial engagement of the latch arm 168 with the drive pawl 142. During rotation of the worm gear 102 from the 240° position in the clockwise direction back to its initial position, that is one complete revolution, the drive plate 132, the shaft 36 and the crank arm 38 will move angularly in the counterclockwise direction throughout an angle F. When the worm gear 102 has made one complete revolution relative to the driven plate 132, the drive pins 148 and 150 on the drive and lock pawls respectively will again be aligned with their respective notches 114 and 118 so that the spring 154 will effect reengagement of the drive pins with their respective notches to again establish the driving connection between the driven plate and the worm gear. During the last 180° rotation of the worm gear 102 and the hub 108, the shaft 36 is moved upwardly to its running position as shown in Figure 6.

With particular reference to Figure 5, electrical circuits for controlling the wiper unit for independent operation, or for conjoint operation with the washer unit will be described. The motor 28 is of the compound wound direct current type and thus includes a series field winding 220 and a shunt field winding 222, the inner ends of which are connected to a wire 224. The series field winding is electrically connected to a brush 226 associated with the commutator of the armature 228. The other commutator brush 230 is connected to ground. The motor 28 can be energized from a battery 232, one terminal of which is connected to ground and the other terminal of which is connected through an overload switch 234 to a wire 236. Wire 236 is connected to the coil of the electromagnet 192, the coil being connected to a wire 238. Wire 238 connects with a stationary switch contact 240 of a manual wiper unit control switch 242. The switch 242 also includes stationary contacts 244, 246 and 248, as well as a movable bridging contact 250 and a push button movable contact 252. The bridging contact 250 is connected to ground, and the movable push button contact 252 is electrically connected to the bridging contact 250.

A resistor 254 is connected between the stationary contacts 244 and 246. Contact 246 is also connected to a wire 256 that is connected to a leaf spring contact 258. The contact 258 is engageable with a leaf spring contact 260 connected to a wire 262. The wire 262 is connected to the other end of the shunt field winding 222 and one end of a resistor 264, the other end of which is connected to ground. Leaf spring contact 204 of the parking switch is connected to wire 236, and leaf spring contact 206 is connected to the wire 224. Contact 248 is connected to wire 266 which connects with a winding 268 of the electromagnet 270 associated with the washer unit. The other end of the winding 268 is connected to a wire 272 which connects with the wire 236.

As disclosed in the aforementioned copending application, Serial No. 709,056, the washer unit includes a ratchet cam assembly 274, and the electromagnet 270 controls a ramp 276 which is normally biased by a spring 278 into engagement with a notch 280 of the ratchet cam 274. When the ramp 276 engages the notch 280, the driving connection between the ratchet cam and the wiper motor is interrupted. The outwardly projecting end 136' of the pin 136 on the drive plate 132 is utilized to drive a cam, not shown, in timed relation with the stroking movement of the wiper blades, the cam being operable to actuate a pump rod and a drive pawl for the ratchet cam.

Upon movement of the bridging member 250 to the low speed position, the electromagnet 192 is energized from the battery through the overload switch 234, the wire 236, the electromagnet coil, wire 238 and switch contacts 240 and 250. Upon energization of the electromagnet 192, contact 206 is moved into engagement with the contact 204 thereby energizing the motor 28 from the battery through the overload switch 234, wire 236, contacts 204 and 206, wire 224, the series field winding 220, brush 226, armature 228 and brush 230. During low speed operation, the shunt field winding 222 is energized from the wire 224, and the other end of the shunt field winding is connected to ground through wire 262, contacts 260 and 250, wires 256, and switch contacts 246 and 250. When the bridging contact 250 is moved to the medium speed position, the resistor 254, which may be of 20 ohms, is connected in series with shunt field winding 222 so as to reduce the energization thereof. When the contact 250 is moved to the high speed position, the resistor 264 which may be of 60 ohms, is connected in series with the shunt field winding 222 to further reduce the energization thereof.

When the bridging contact 250 is moved from any of the "on" positions to the "off" position, the electromagnet 192 is deenergized. However, since contacts 204 and 206 remain in engagement with each other, the motor 28 continues to be energized at low speed. Moreover, upon deenergization of the electromagnet 192, the latch arm 168 is moved by the spring 178 into the path of movement of the drive pawl 142. Accordingly, the flange 154 of the drive pawl 142 will engage the latch arm 168 in a predetermined angular position of the worm gear and hub assembly so as to interrupt the driving connection between the worm gear and the driven plate 132. During continued rotation of the worm gear 102 by the motor 28, the throw of the crank 38 will be increased due to relative rotation between the hub 108 and the driven plate 132. When the throw of the crank is substantially a maximum, drive pawl 142 will engage the actuator 212 to separate contacts 204 and 206 thereby deenergizing the motor 28. The motor 28 will coast to a standstill without appreciably altering the depressed parked position of the wiper blades.

When it is desired to operate the washer unit conjointly with the wiper unit, the push button contact 252 is moved into engagement with the switch contact 248. The contact 252 has a connection with the bridging contact 250 as disclosed in the aforementioned copending application Serial No. 709,056 whereby when the contact 252 is moved into engagement with the contact 248, the bridging contact 250 is moved to the low speed position. Accordingly, the motor 28 will be energized for low speed rotation as described hereinbefore. In addition, the electromagnet 270 will be energized from the battery through wires 236 and 272, the coil 263, the wire 266, the switch contacts 248, 252 and 250. Upon energization of the electromagnet 270, the armature 276 will be moved into engagement with the core of the electromagnet 270 so as to establish the driving connection between the wiper unit and the washer unit. Accordingly, the ratchet cam 274 will have imparted thereto step by step movement in the counterclockwise direction as viewed in Figure 5, and the washer pump will intermittently discharge liquid solvent onto the windshield in timed relation with the stroking movement of the wiper blades. During the first 180° of rotation of the ratchet cam 274 in the counterclockwise direction, the switch contacts 258 and 260 will be opened by a follower 282 which engages a cam 284 formed on the ratchet cam 274. When contacts 258 and 260 are separated, the wiper motor 28 will operate at high speed since the shunt field winding 222 is connected in series with the resistor 264. After a 180° movement of the ratchet cam 274 in the counterclockwise direction, the driving connection between the washer pump and the wiper motor is interrupted, and in addition contacts 258 and 260 are reengaged so that the wiper motor 28 will operate at low speed. After the ratchet cam 274 has completed one revolution, the armature 276 falls into the notch 280 thereby interrupting the driving connection between the wiper unit and the ratchet cam. It is pointed out, that the switch 252 need only be momentarily engaged with the contact 248, since after the ratchet cam 274 moves through the distance of one tooth the armature 276 cannot reengage the notch 280 until the ratchet cam has completed one revolution. The wiper motor 28 will continue to operate so as to dry the windshield until the operator moves the contact 250 from the low speed position to the off position.

From the foregoing it is apparent that the present invention provides a crank means of the rotary type having a running orbit together with means for substantially arresting rotation of the crank means and increasing the throw thereof to drive the wiper blades to a depressed parked position. In addition, the crank assembly is designed so that it can be utilized to actuate a washer pump in timed relation with the stroking movement of the wiper blades.

While the embodiment of the invention as herein disclosed constitutes a preferred form, it is to be understood that other forms might be adopted.

What is claimed is as follows:

1. Windshield wiper actuating mechanism including, a rotatable driving member having a hub, means rotatably journalling said hub whereby the driving member is rotatable about the axis of said hub, a shaft eccentrically journalled for rotation within said hub, means interconnecting said shaft and said driving member to establish an interruptible driving connection therebetween, crank means connected to said shaft, a wiper actuating driven member, means interconnecting said crank means and said driven member whereby rotation of said crank means will impart oscillation to said driven member, and means for interrupting the driving connection between said shaft and said driving member to substantially arrest rotation of said shaft whereby continued rotation of said driving member will effect relative movement between said hub and said shaft to displace said shaft and vary the throw of said crank means.

2. Windshield wiper actuating mechanism including, a rotatable driving member including a hub having an eccentric through bore, means rotatably journalling said hub whereby the driving member is rotatable about the axis of said hub, a shaft rotatably journalled within the eccentric through bore of said hub, spring biased means interconnecting said shaft and said driving member to establish an interruptible driving connection therebetween, crank means connected to said shaft, a wiper actuating driven member, means interconnecting said crank means and said driven member whereby rotation of said crank means will impart oscillation to said driven member, and means operable to interrupt the driving connection between said shaft and said driving member to substantially arrest rotation of said shaft whereby continued rotation of said driving member will effect relative movement between said hub and said shaft to shift the position of said shaft and vary the throw of said crank means.

3. Windshield wiper actuating mechanism including, a rotatable driving member including a hub having an eccentric through bore, means rotatably journalling said hub whereby said driving member is rotatable about the axis of said hub, a shaft rotatably journalled within the eccentric through bore of said hub, a driven element attached to said shaft, means interconnecting said driven element and said driving member to establish an interruptible driving connection therebetween, crank means connected to said shaft, a wiper actuating driven member, means interconnecting said crank means and said driven member whereby rotation of said crank means will impart oscillation to said driven member, and means operable to interrupt the driving connection between said driven element and said driving member to substantially arrest rotation of said shaft whereby continued rotation of said driving member will effect relative movement between said hub and said shaft to displace said shaft and vary the throw of said crank means.

4. Windshield wiper actuating mechanism including, a rotatable driving member including a hub having an eccentric through bore, means rotatably journalling said hub whereby said driving member is rotatable about the axis of said hub, a shaft rotatably journalled within an eccentric through bore of said hub, a driven element attached to said shaft, a spring biased pawl carried by said driven element and operable to engage said driving member to establish an interruptible driving connection therebetween, crank means connected to said shaft, a wiper actuating driven member operatively connected to said crank means, and means engageable with said pawl to interrupt the driving connection between said driven element and said driving member to substantially arrest rotation of said shaft whereby continued rotation of said driving member will effect relative movement between said hub and said shaft to displace said shaft and vary the throw of said crank means.

5. Windshield wiper actuating mechanism including, a rotatable driving member including a hub having an eccentric through bore, means rotatably journalling said hub whereby said driving member is rotatable about the axis of said hub, a shaft rotatably journalled within and extending through the eccentric through bore of said hub, a driven element attached to one end of said shaft on one side of said hub, means carried by said driven element and engageable with said driving member to establish an interruptible driving connection therebetween, a fixed length crank connected to the other end of said shaft on the other side of said hub, a wiper actuating driven member, means interconnecting said crank and said driven member whereby rotation of said crank will impart oscillation to said driven member, and means operable to interrupt the driving connection between said driven element and said driving member to substantially arrest rotation of said shaft whereby continued rotation of said driving member will effect relative movement between said hub and said shaft to displace said shaft and vary the throw of said crank.

6. The mechanism set forth in claim 5 wherein said driving member comprises a worm gear having a cam track therein with a notch, and wherein the means carried by said driven element and engageable with said driving member comprises a pawl pivotally mounted on said driven element and carrying a pin operable to engage the notch in said cam track.

7. The mechanism set forth in claim 5 wherein said driving member comprises a worm gear having a cam track therein, said cam track including an arcuate ledge portion having a notch and a second notch in said cam track angularly spaced from said first notch, wherein said driven element comprises a plate, and wherein the means carried by said driven element and engageable with said driven member comprises a drive pawl pivotally mounted on said plate and having a pin engageable with the second notch of said cam track.

8. The mechanism set forth in claim 7 wherein said drive plate carries a pivotally mounted lock pawl having a pin engageable with the first notch in said cam track, and wherein said drive pawl and said lock pawl are interconnected by a spring which normally maintains the pins of said drive pawl and said lock pawl engaged with their respective notches so as to establish the driving connection between said plate and said worm gear.

9. A variable throw crank assembly including in combination, a housing, a rotatable driving member having a hub, means rotatably journalling said hub in said housing whereby the driving member is rotatable about the axis of said hub, a shaft eccentrically journalled for rotation within said hub, means interconnecting said shaft and said driving member to establish an interruptible driving connection therebetween, a crank connected to said shaft, and means operable to interrupt the driving connection between said shaft and said driving member to substantially arrest rotation of said shaft whereby continued rotation of said driving member will effect relative movement between said hub and said shaft to displace said shaft and vary the throw of said crank.

10. A variable throw crank assembly including in combination, a housing, a rotatable driving member including a hub having an eccentric through bore, means rotatably journalling said hub within said housing whereby the driving member is rotatable about the axis of said hub, a shaft rotatably journalled within the eccentric through bore of said hub, spring biased means interconnecting said shaft and said driving member to establish an interruptible driving connection therebetween, a crank connected to said shaft, and means operable to interrupt the driving connection between said shaft and said driving member to substantially arrest rotation of said shaft whereby continued rotation of said driving member will effect relative movement between said hub and said shaft to displace said shaft and vary the throw of said crank.

11. A variable throw crank assembly including in combination, a housing, a rotatable driving member including a hub having an eccentric through bore, means rotatably journalling said hub in said housing whereby the driving member is rotatable about the axis of said hub, a shaft rotatably journalled within the eccentric through bore of said hub, a driven element attached to said shaft, means interconnecting said driven element and said driving member to establish an interruptible driving connection therebetween, a crank connected to said shaft, and means operable to interrupt the driving connection between said driven element and said driving member to substantially arrest rotation of said shaft whereby continued rotation of said driving member will effect relative movement between said hub and said shaft to displace said shaft and vary the throw of said crank.

12. A variable throw crank assembly including in combination, a housing, a rotatable driving member including a hub having an eccentric through bore, means rotatably journalling said hub within said housing whereby said driving member is rotatable about the axis of said hub, a shaft rotatably journalled within the eccentric through bore of said hub, a driven element attached to said shaft, a spring biased pawl carried by said driven element and engageable with said driving member to establish an interruptible driving connection therebetween, a crank connected to said shaft, and means engageable with said pawl to interrupt the driving connection between said driven element and said driving member to substantially arrest rotation of said shaft whereby continued rotation of said driving member will effect relative movement between said hub and said shaft to displace said shaft and vary the throw of said crank.

13. Windshield wiper actuating mechanism including, a rotatable driving member including a hub having an eccentric through bore, means rotatably journalling said hub whereby said driving member is rotatable about the axis of said hub, a wiper actuating driven member, an electric motor for rotating said driving member, a source of electric power, circuit means interconnecting said power source and said motor including a switch, switch actuating means operatively connected with said driven member for opening said switch when said driven member is moved to a predetermined position, a shaft journalled for rotation within the eccentric through bore of said hub, means interconnecting said shaft and said driving member to establish an interruptible driving connection therebetween, crank means connected to said shaft, means interconnecting said crank means and said driven member whereby rotation of said crank means will impart oscillation to said driven member, and means operable to interrupt the driving connection between said shaft and said driving member to substantially arrest rotation of said shaft whereby continued rotation of said driving member will effect relative movement between said hub and said shaft to displace said shaft and vary the throw of said crank means to move said driven member to said predetermined position to automatically operate said switch actuating means and deenergize said motor.

14. Windshield wiper actuating mechanism including, a rotatable driving member including a hub having an eccentric through bore means rotatably journalling said hub whereby said driving member is rotatable about the axis of said hub, a wiper actuating driven member, an electric motor drivingly connected to said driving member for effecting rotation thereof, a source of electric power, circuit means interconnecting said power source and said motor including a switch, switch actuating means operatively connected with said driven member for opening said switch when said driven member is moved to a predetermined position, a shaft rotatably journalled within the eccentric through bore of said hub, a driven element attached to said shaft, means carried by said driven element and engageable with said driving member to establish an interruptible driving connection therebetween, crank means connected to said shaft, means interconnecting said crank means and said driven member whereby rotation of said crank means will impart oscillation to said driven member, and means engageable with the means carried by said driven element for interrupting the driving connection between said driven element and said driving member to substantially arrest rotation of said shaft whereby continued rotation of said driving member will effect relative movement between said hub and said shaft to displace said shaft and vary the throw of said crank means to move said driven member to said predetermined position to automatically operate said switch actuating means and deenergize said motor.

15. The mechanism set forth in claim 14 wherein the means carried by the driven element and engageable with the driving member comprises a pawl.

16. The mechanism set forth in claim 15 wherein the means engageable with the means carried by the driven element comprises a pivotally movable latch arm which is movable into and out of the path of movement of said pawl.

17. The means set forth in claim 14 wherein the means carried by said driven element comprises a pawl, wherein said last recited means comprises a pivotally mounted latch arm engageable with said pawl, and wherein said switch actuating means includes said drive pawl.

18. Windshield wiper actuating and control mechanism including, a unidirectional electric motor, a rotatable driving member connected to said motor, a wiper actuating driven member, variable throw crank means operatively connected to said driven member, means interconnecting said crank means and said driving member to establish an interruptible driving connection therebetween, means operable to interrupt the driving connection between said crank means and said driving member to substantially arrest rotation of said crank means and vary the throw of said crank means including a latch, an electromagnet having an armature for controlling the position of said latch, a manual switch for controlling the energization of said electromagnet, and cam means integral with said driving member and engageable with said latch for reducing the air gap between said armature and said electromagnet during variation in the throw of said crank means.

19. The mechanism set forth in claim 18 wherein the means interconnecting the crank means and the driving member comprises a drive pawl.

20. The mechanism set forth in claim 19 including a switch for controlling energization of said electric motor, said drive pawl constituting an actuator for said switch to de-energize said motor when the throw of the crank means is substantially a maximum.

21. Windshield wiper actuating and control mechanism including, an electric motor, an energizing circuit for said motor including a parking switch comprising a pair of spaced leaf spring contact members inherently biased towards each other, a first actuator rigidly connected to one of said members and a second actuator having a lost motion connection with the other of said contact members, an electromagnet having an armature connected with said second actuator for closing said parking switch irrespective of the position of said first actuator when said electromagnet is energized, means engageable with said first actuator to open said parking switch when said electromagnet is deenergized, and means operatively associated with said armature for reducing the air gap between said armature and said electromagnet concurrently with operation of said first actuator to open said parking switch.

22. Windshield wiper actuating and control mechanism including, an electric motor, an energizing circuit for said motor including a parking switch comprising a pair of leaf spring contact members inherently biased towards each other, a first actuator rigidly connected to one of said contact members and a second actuator having a lost motion connection with the other of said contact members, an electromagnet having an armature connected with said second actuator for closing said parking switch irrespective of the position of said first actuator when said electromagnet is energized, means engageable with said first actuator to open said parking switch when said electromagnet is deenergized, and a cam member driven by said electric motor and operatively associated with said armature for reducing the air gap between said armature and said electromagnet concurrently with operation of the first actuator to open said parking switch.

23. Windshield wiper actuating and control mechanism including, an electric motor, a variable throw crank assembly driven by said electric motor, an energizing circuit for said electric motor including a parking switch comprising a pair of spaced leaf spring contact members inherently biased towards each other, a first actuator rigidly connected to one of said contact members and a second actuator having a lost motion connection with the other of said contact members, control means for said variable throw crank assembly including an electromagnet having an armature connected with said second actuator for closing said parking switch irrespective of the position of said first actuator when the electromagnet is energized, means engageable with said first actuator to open said parking switch when the electromagnet is deenergized, and a cam member driven by said electric motor and operatively associated with said armature for reducing the air gap between said armature and said electromagnet concurrently with operation of said first actuator to open said parking switch.

References Cited in the file of this patent
UNITED STATES PATENTS

| | | |
|---|---|---|
| 1,825,418 | Pfeiffer et al. | Sept. 29, 1931 |
| 2,173,447 | Horton | Sept. 19, 1939 |
| 2,564,982 | Lane | Aug. 21, 1951 |
| 2,566,261 | Torkelson | Aug. 28, 1951 |
| 2,753,023 | Marvin | July 3, 1956 |
| 2,838,956 | Schneider | June 17, 1958 |
| 2,861,457 | Harrison | Nov. 25, 1958 |
| 2,866,344 | Reese | Dec. 30, 1958 |

FOREIGN PATENTS

| | | |
|---|---|---|
| 411,012 | Italy | June 19, 1945 |
| 873,409 | France | July 8, 1942 |